(12) United States Patent
Nadumane et al.

(10) Patent No.: US 12,276,954 B2
(45) Date of Patent: *Apr. 15, 2025

(54) METHODS OF SYNCHRONIZING CONTROLLERS IN A BUILDING MANAGEMENT SYSTEM

(71) Applicant: Honeywell International Inc., Charlotte, NC (US)

(72) Inventors: Venugopal Kilingar Nadumane, Bangalore (IN); Rajkumar Selvam, Bengaluru (IN); Nishant Omar, Wigan (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/131,201

(22) Filed: Apr. 5, 2023

(65) Prior Publication Data

US 2023/0236561 A1 Jul. 27, 2023

Related U.S. Application Data

(63) Continuation of application No. 16/897,175, filed on Jun. 9, 2020, now Pat. No. 11,635,740.

(51) Int. Cl.
*G05B 19/042* (2006.01)

(52) U.S. Cl.
CPC .. *G05B 19/042* (2013.01); *G05B 2219/25011* (2013.01); *G05B 2219/25482* (2013.01)

(58) Field of Classification Search
CPC ........ G05B 19/042; G05B 2219/25011; G05B 2219/25482; G05B 2219/2642; G05B 19/0426
See application file for complete search history.

(56) References Cited

U.S. PATENT DOCUMENTS

| | | |
|---|---|---|
| 6,997,390 B2 | 2/2006 | Alles |
| 7,154,862 B2 | 12/2006 | Krzyzanowski |
| 8,532,797 B2 | 9/2013 | Gutha et al. |
| 8,640,098 B2 | 1/2014 | Nair et al. |

(Continued)

FOREIGN PATENT DOCUMENTS

CN 101632050 B 7/2013

*Primary Examiner* — Mohammad Ali
*Assistant Examiner* — Sheela Rao
(74) *Attorney, Agent, or Firm* — Seager, Tufte & Wickhem, LLP

(57) ABSTRACT

A method of commissioning a plurality of controllers includes identifying a plurality of controllers that are operably coupled to a network in a building management system. Each of the plurality of controllers are configured to control one or more of a plurality of building management system components within a building management system. A first controller is selected as a source controller. Two or more of the remaining controllers are selected as target controllers. A synch operation is initiated that synchs the control logic of the source controller with each of the two or more target controllers over the network, resulting in each of the two or more target controllers having the control logic of the source controller. The source controller and the two or more target controllers are subsequently used to control one or more respective building management system components of the building management system.

20 Claims, 8 Drawing Sheets

(56) References Cited

U.S. PATENT DOCUMENTS

| | | | |
|---|---|---|---|
| 8,640,120 | B2 | 1/2014 | Gutha et al. |
| 8,719,385 | B2 | 5/2014 | Nair et al. |
| 2002/0152298 | A1 | 10/2002 | Kikta et al. |
| 2011/0196539 | A1 | 8/2011 | Nair et al. |
| 2012/0272146 | A1 | 10/2012 | D'Souza et al. |
| 2016/0209059 | A1* | 7/2016 | Castillo ............... H04L 12/2823 |
| 2018/0252422 | A1* | 9/2018 | Salsbury ............ G05B 19/0426 |

* cited by examiner

METHODS OF SYNCHRONIZING CONTROLLERS IN A BUILDING MANAGEMENT SYSTEM

This is a continuation of co-pending U.S. patent application Ser. No. 16/897,175, filed Jun. 9, 2020, and entitled "METHODS OF SYNCHRONIZING CONTROLLERS IN A BUILDING MANAGEMENT SYSTEM", which is incorporated herein by reference.

TECHNICAL FIELD

The present disclosure relates generally to building management systems. More particularly, the present disclosure relates to building management systems that include a number of different controllers.

BACKGROUND

Building management systems may be used to control operations of a variety of different building management system components. In many cases, a building management system can include a large number of individual controllers, each of which need to be initially configured and/or commissioned. In some cases, there may be a need to subsequently update one or more features of each of the large number of individual controllers. Configuring or updating each of these controllers can be a time-consuming, error-prone process. What would be desirable is an improved way to configure and/or update each of a large number of individual controllers within a building management system.

SUMMARY

The present disclosure relates generally to building management systems that include a number of different controllers. In one example, a method of commissioning a plurality of controllers includes identifying a plurality of controllers that are operably coupled to a network. Each of the plurality of controllers are configured to operate one or more of a plurality of building management system components within a building management system. A first controller is programmed with a control logic and is selected as being a source controller. Two or more of the remaining controllers are selected as target controllers. A synch operation is initiated that synchs the control logic of the source controller with each of the two or more target controllers over the network, resulting in each of the two or more target controllers having the control logic of the source controller. The source controller and the two or more target controllers subsequently control one or more respective building management system components using the control logic. The source and target relationship between the controllers may be stored for later use, such as when the first controller receive an updated or is otherwise reprogrammed, then the updated programming may be easily reflected in the target controllers with little or no effort by a user.

In another example, a method includes sharing one or more control parameters between a plurality of controllers, where each of the plurality of controllers control operation of one or more building component of a building control system based at least in part on the control parameters. Each of the plurality of controllers may include one or more function blocks that reference one or more of the control parameters. Like above, a first controller of the plurality of controllers is designated as a source controller. One or more other controllers of the plurality of controllers are designated as target controllers. For at least one function block within the source controller, one or more control parameters from the respective function block of the source controller are synchronized with corresponding control parameters in a corresponding function block of each target controller. In some cases, the particular control parameters that are to be synchronized are tagged with a master synch property in advance by a user. The properties that are not tagged with the master synch property are not synchronized.

In some case, a first controller is selected as being a source controller. Two or more of the remaining controllers are selected as target controllers. A synch operation is initiated that synchs the control logic of the source controller with each of the two or more target controllers over the network, resulting in each of the two or more target controllers having the control logic of the source controller. In some cases, some of the control parameters are tagged with a master synch property. When so provided, the control parameters that are tagged with a master synch property may be synchronized as part of the synch operation, while the control parameters that are not tagged with the master synch property are not synchronized.

In another example, a method of programming a plurality of controllers includes creating a control logic for a first controller of the plurality of controllers, where each of the plurality of controllers is configured to control operation of a building component. The control logic may include a plurality of function blocks. The first controller may be designated as a source controller and other controllers of the plurality of controllers may be designated as target controllers by a user. A synch operation is performed between the source controller and each of the target controllers. When one of the target controllers does not have its own control logic, the synch operation includes copying all of the control logic from the source controller to the particular target controller. When one of the target controllers already has its own control logic, the synchronization operation includes copying only function blocks from the control logic within the source controller that are not present within the control logic of the particular target controller. Also, when some of the control parameters of the source controller are tagged with a master synch property, the control parameters that are tagged with a master synch property may be synchronized as part of the synch operation, while the control parameters that are not tagged with the master synch property are not synchronized.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
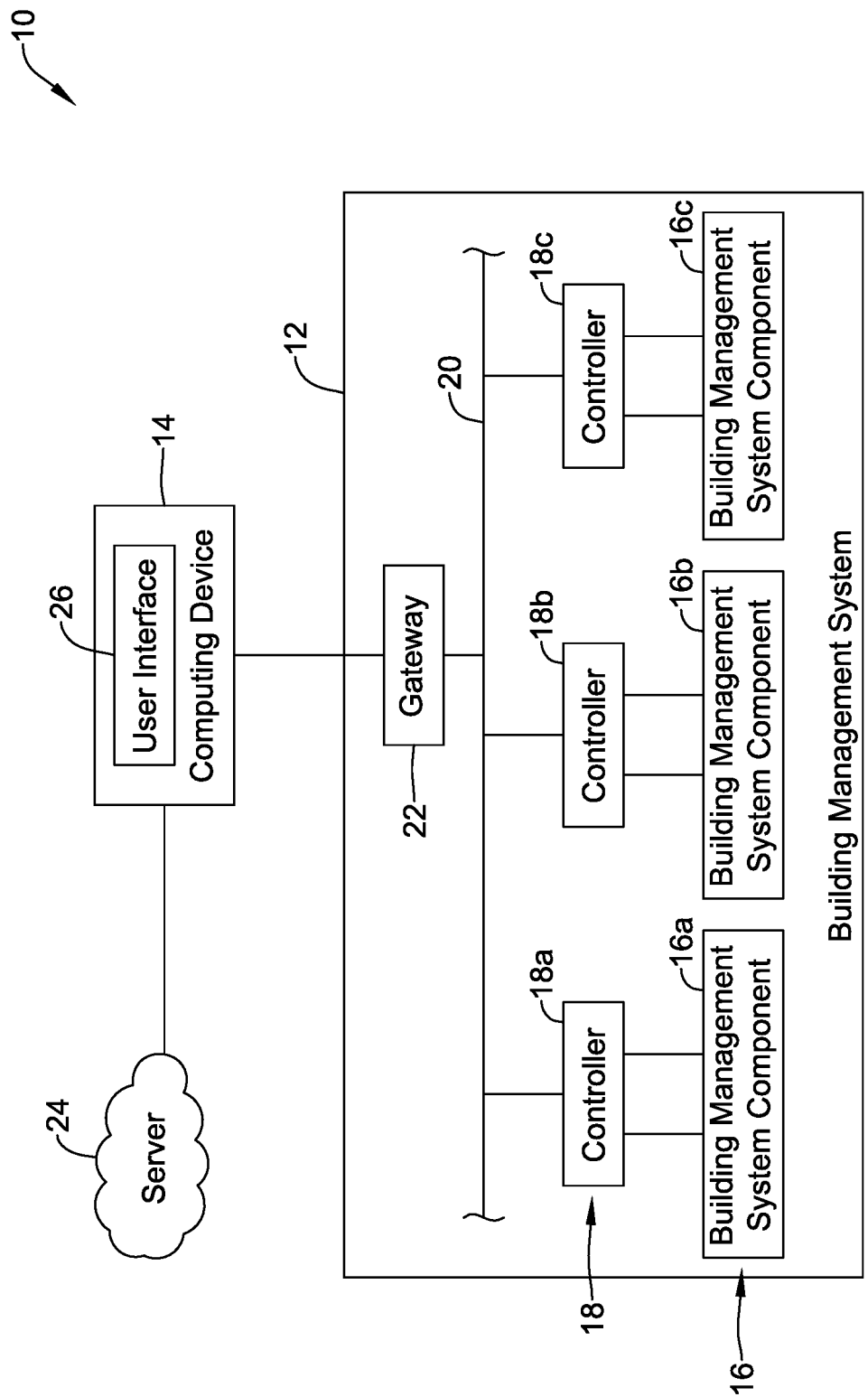
FIG. 1 is a schematic block diagram of an illustrative system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building system 10. In its broadest terms, the illustrative building system 10 includes a building management system 12 and a computing device 14. The building management system 12 may generally represent any of a variety of different building management systems. For example, the building management system 12 represent a Heating, Air Conditioning and Ventilating (HVAC) system, a lighting system and/or a security system. The building management system 12 includes a number of building management system components 16 that are individually labeled as 16a, 16b and 16c. While a total of three building management system components 16 are shown, it will be appreciated that this is merely illustrative, as the building management system 12 may include any number of building management system components 16. The building management system components 16 may represent individual components within a Heating, Air Conditioning and Ventilating (HVAC) system, such as heating sources, cooling sources, ventilation sources, VAV (Variable-Air-Volume) boxes, air dampers and the like, for example. Some of the building management system components 16 may represent individual components within a security system, such as security sensors, control pads and the like. Some of the building management system components 16 may represent individual components within a lighting system, such as individual lighting sources.

The building management system 12 includes a number of controllers 18 that are individually labeled as 18a, 18b, 18c. The controllers 18 may be used, for example, to control operation of the building management system components 16. While a total of three controllers 18 are shown, it will be appreciated that this is merely illustrative, as the building management system 12 may include any number of controllers 18. While shown as having a one-to-one relationship between an individual building management system component and a corresponding individual controller 18, this is not necessary in all cases. For example, in some cases, a single controller 18 could control operation of two or more different building management system components 16.

In an HVAC system, for example, a particular controller 18 could control operation of a VAV box that is represented by one of the building management system components 16. The controller 18 for that particular building management system component 16 may control the relative damper position within the VAV box in order to achieve a desired air flow, or perhaps to achieve a desired temperature set point, within a corresponding portion of the building management system 12. These are just examples.

Each of the controllers 18 are operably coupled with a local network 20. The local network 20 may be a hard-wired network, for example, or may in some cases be a wireless network. A gateway 22 may be operably coupled to the local network 20, and thus may be operably coupled to each of the controllers 18 that are themselves operably coupled to the local network 20. In some cases, particularly if the building management system 12 is relatively small, there may not be a local network 20. In such cases, each of the controllers 18 may instead be directly coupled to the gateway 22 via a wired or wireless connection. In some cases, the local network 20 may operate in accordance with a network protocol, such as BACNET, MODBUS, LONTALK, ENOCEAN, ZIGBEE, X10 and/or any other suitable network protocol.

In the example shown, the gateway 22 functions as an intermediary between the controllers 18 and the computing device 14. For example, the gateway 22 may be configured to be able to interrogate any devices it finds operably coupled to the local network 20, and to obtain information such as metadata from those devices that helps the gateway 22 and/or the computing device 14 discover those devices, including the controllers 18 and in some cases the building management system components 16. The gateway 22 may also be configured to receive local configuration information from the computing device 14, and provide appropriate local configurations to each of the controllers 18 such that each of the controllers 18 are best able to control operation of the building management system component(s) 16 for which they are responsible. In some cases, the gateway 22 may be configured to collect operational data regarding operation of the building management system components 16 that is initially collected by the controllers 18, and may be configured to provide the collected operational data to the computing device 14.

In some cases, the computing device 14 may be operably coupled with a cloud-based server 24. The cloud-based server 24 may represent a single computer server or a collection of computer servers. The computing device 14 may be a stand-alone computer that is distinct from the cloud-based server 24. In some cases, the computing device 14 may itself represent a server such as a cloud-based server that is remote from a building site at which the building management system 12 resides. When the computing device 14 represents a server such as a cloud-based server, this may include being part of the cloud-based server 24. The computing device 14 includes a user interface 26 that may be used for displaying information for a user and/or for accepting inputs from the user.

Figure 2:
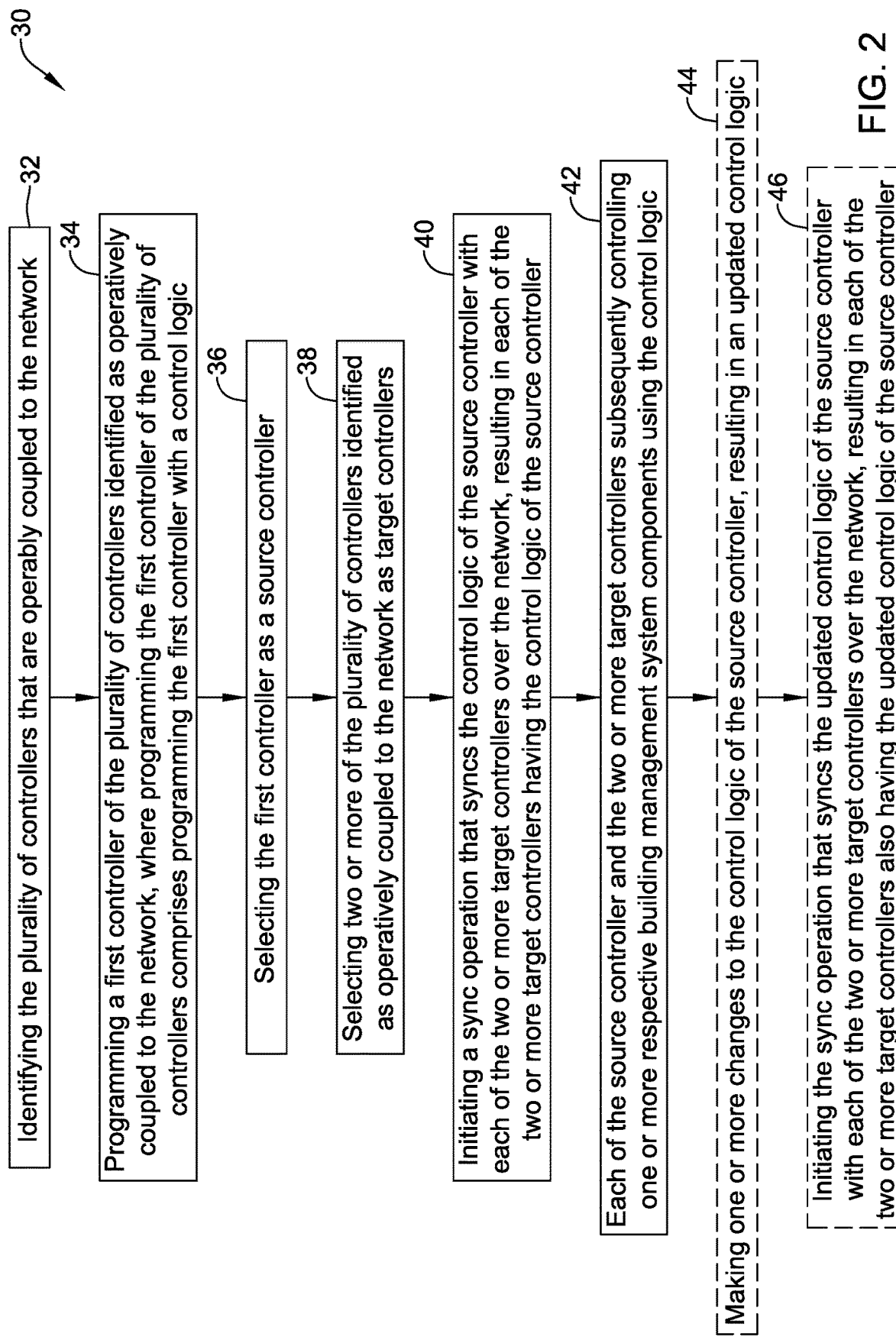
FIG. 2 is a flow diagram showing an illustrative method that may be carried out by the illustrative system of FIG. 1.

FIG. 2 is a flow diagram showing an illustrative method 30 of commissioning a plurality of controllers (such as the controllers 18) that are operably coupled to a network (such as the network 20), where each of the plurality of controllers are configured to operate one of a plurality of building management system components (such as the building management system components 16) within a building management system (such as the building management system 12). The plurality of controllers that are operably coupled to the network are identified, such as through a discover process, as indicated at block 32. For example, when the network is a BACNET network, the BACNET protocol defines a discovery process for discovering devices on the BACNET network.

Programming for a first controller of the plurality of controllers identified as operatively coupled to the network is identified, where the programming defines control logic for controlling a respective building management system component, as indicated at block 34. In the example show, the first controller is selected as a source controller, as indicated at block 36. Two or more of the plurality of controllers that were identified as operatively coupled to the network and control similar building management system component, are selected as target controllers, as indicated at block 38. Once this source-target relationship is defined, a synch operation is initiated that synchs the control logic of the source controller with each of the two or more target controllers over the network, resulting in each of the two or more target controllers having the same control logic as the source controller, as indicated at block 40. In this application, the term "synch" or "synch operation" references a one-way synchronization, from source-to-target(s) and not from target(s)-to-source. Each of the source controller and the two or more target controllers are then subsequently used to control one or more respective building management system components using the control logic, as indicated at block 42.

In some cases, one or more changes may be made to the control logic of the source controller, resulting in an updated control logic, as optionally indicated at block 44. Using the previously defined source-target-source relationship, a synch operation may be initiated that synchs the updated control logic of the source controller with each of the two or more target controllers over the network, resulting in each of the two or more target controllers having the updated control logic of the source controller, as optionally indicated at block 46.

In some cases, the control logic may include or may be defined by a number of function blocks and a number of interconnections between the number of function blocks. Making one or more changes to the control logic of the source controller may include one or more of adding a new function block or removing an existing function block. Making one or more changes to the control logic of the source controller may include changing one or more input connections and/or one or more output connections of one or more of the function blocks. Making one or more changes to the control logic of the source controller may include changing one or more control parameters that are referenced by one or more of the function blocks. In some cases, only the changes to the control logic are downloaded to the target controllers, and not all of the control logic. This may help reduce the network load during an update.

In some cases, the control logic of the source controller may reference a plurality of control parameters. In some instances, the method 30 may include assigning a master synch property to at least one of the plurality of control parameters, and the synch operation may synch those control parameters that have been assigned the master synch property with each of the two or more target controllers over the network. For those control parameters that are not assigned the master synch property, the synch operation does not synch those control parameter(s) to the target devices. This allows the target devices to retain certain unique control parameters. For example, if the controllers each control a VAV box in a different building zone, it may be desirable for each controller to maintain a unique temperature set point control parameter for the corresponding zone.

Figure 3:
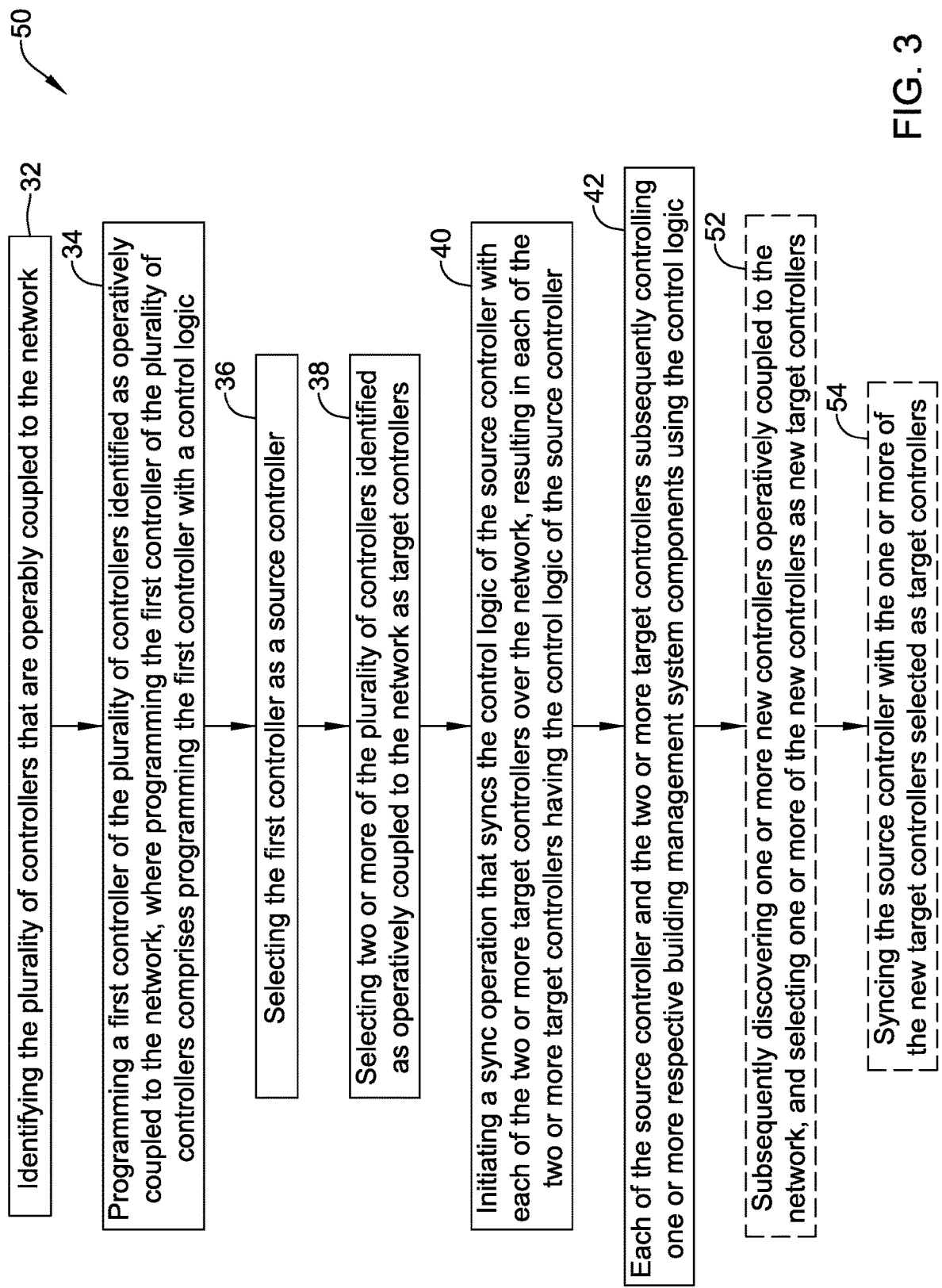
FIG. 3 is a flow diagram showing an illustrative method that may be carried out by the illustrative system of FIG. 1.

FIG. 3 is a flow diagram showing an illustrative method 50 of commissioning a plurality of controllers (such as the controllers 18) that are operably coupled to a network (such as the network 20), where each of the plurality of controllers are configured to operate one of a plurality of building management system components (such as the building management system components 16) within a building management system (such as the building management system 12). The plurality of controllers that are operably coupled to the network are identified, as indicated at block 32. In some instances, each of the plurality of controllers may be assigned an application type parameter, and the source controller and the two or more target controllers must have compatible application type parameters for a synch operation to be performed. In some cases, the source controller and the two or more target controllers must have matching application type parameters. In some cases, the plurality of controllers are identified by executing a device discovery command over the network.

A first controller of the plurality of controllers identified as operatively coupled to the network is programmed, where programming the first controller of the plurality of controllers comprises programming the first controller with a control logic, as indicated at block 34. The first controller is selected as a source controller, as indicated at block 36. Two or more of the plurality of controllers that were identified as operatively coupled to the network are selected as target controllers, as indicated at block 38. A synch operation is initiated that synchs the control logic of the source controller with each of the two or more target controllers over the network, resulting in each of the two or more target controllers having the control logic of the source controller, as indicated at block 40. Each of the source controller and the two or more target controllers subsequently control one or more respective building management system components using the control logic, as indicated at block 42.

In some cases, and as optionally indicated at block 52, one or more new controllers operatively coupled to the network may subsequently be selected, and one or more of the new controllers may be selected and added as new target controllers. The source controller may be synched with the one or more of the new target controllers selected as target controllers, as optionally indicated at block 54.

Figure 4:
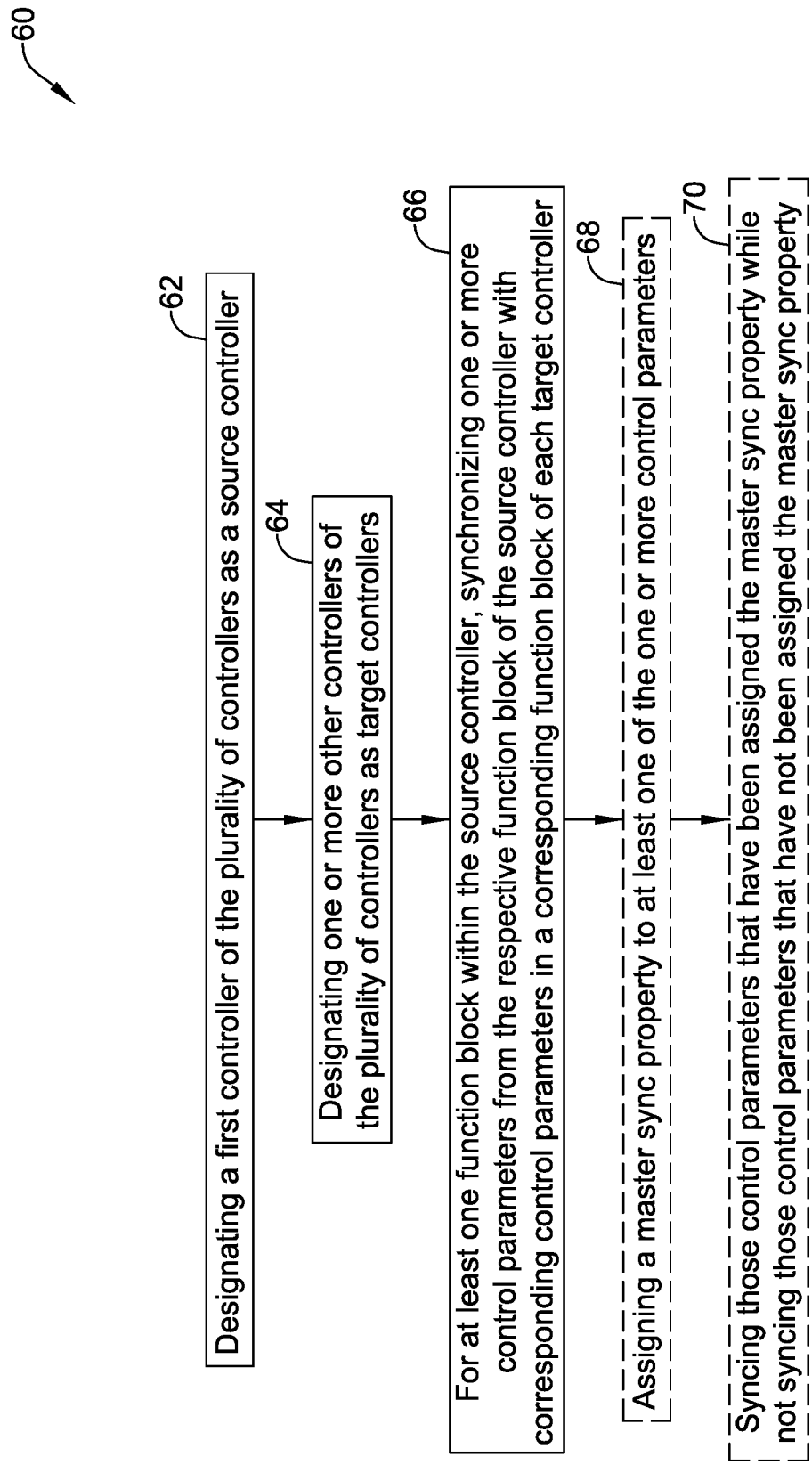
FIG. 4 is a flow diagram showing an illustrative method that may be carried out by the illustrative system of FIG. 1.

FIG. 4 is a flow diagram showing an illustrative method 60 of sharing one or more control parameters between a plurality of controllers (such as the controllers 18), where each of the plurality of controllers are configured to control operation of a building component (such as the building management system components 16) based at least in part on the control parameters. In some cases, each of the plurality of controllers includes control logic that is defined by one or more function blocks. In some instances, each of the plurality of controllers may be assigned an application type parameter by a user, and the source controller and the two or more target controllers must have compatible (e.g. matching) application type parameters.

In the example show, a first controller of the plurality of controllers is designated as a source controller, as indicated at block 62. One or more other controllers of the plurality of controllers are designated as target controllers, as indicated at block 64. For at least one function block within the source controller, one or more control parameters from the respective function block are synchronized with corresponding control parameters in a corresponding function block of each target controller, as indicated at block 66. In some instances, a master synch property may be assigned by a user to those control parameters that are to be synchronized, as optionally indicated at block 68. Those control parameters that have been assigned the master synch property are synched while those control parameters that have not been assigned the master synch property are not synched, as optionally indicated at block 70.

Figure 5:
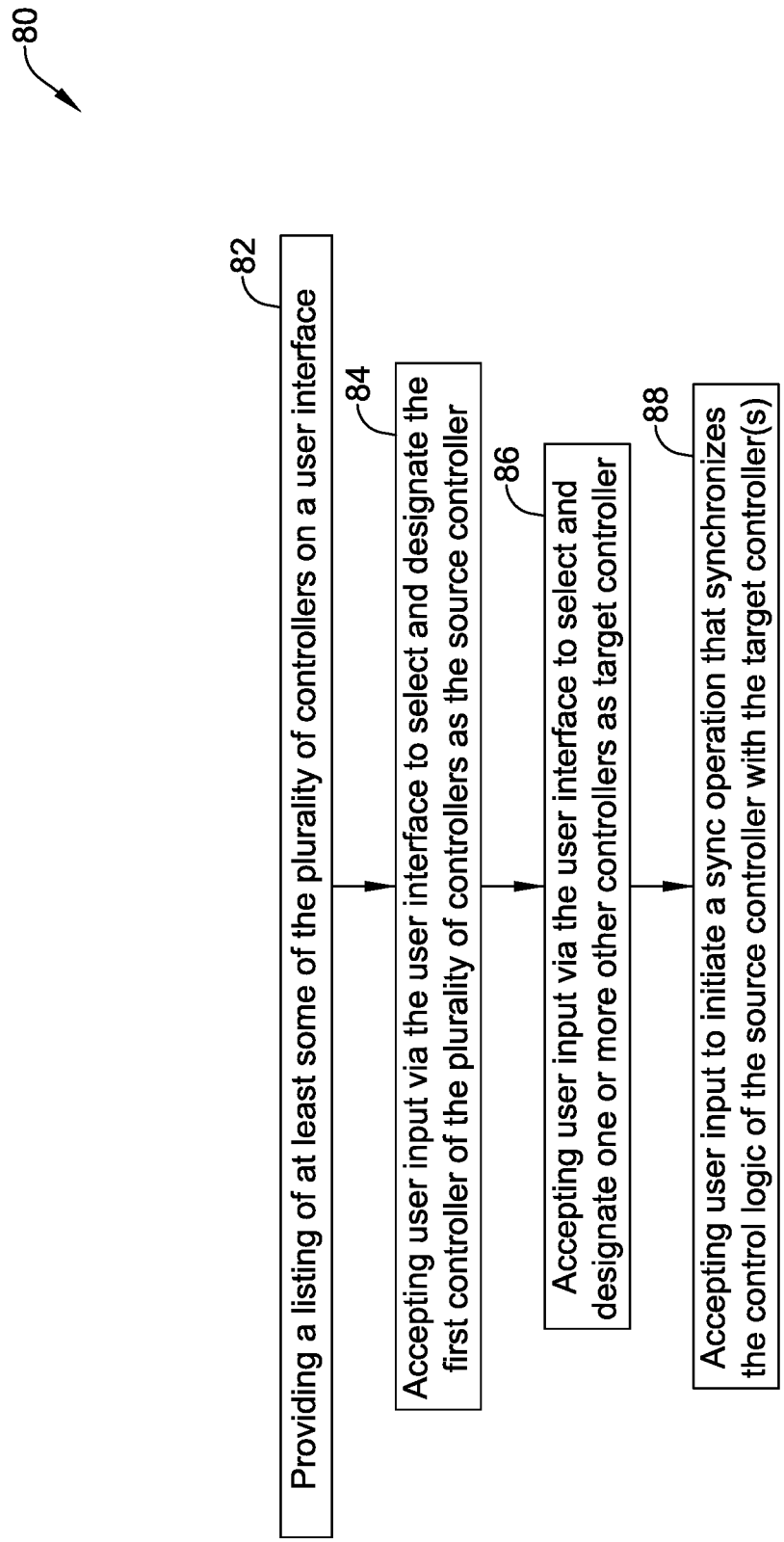
FIG. 5 is a flow diagram showing an illustrative method that may be carried out by the illustrative system of FIG. 1.

FIG. 5 is a flow diagram showing an illustrative method 80 that may be carried out by the illustrative system of FIG. 1. In some cases, a listing of least some of the plurality of controllers may be provided on a user interface such as user interface 26, as indicated at block 82. This listing be derived from those controllers that were discovered through a discover process on the network. For example, when the network is a BACNET network, the BACNET protocol defines a discovery process for discovering devices on the BACNET network. From the listing, a user may select via the user interface one of the listed controllers as the source controller, as indicated at block 84. The user may also select via the user interface one or more of the listed controllers as the target controllers, as indicated at block 86. In some cases, the user may tag certain control parameters with a master synch property. The user may then initiate a synch operation, as indicated at block 88. The synch operation synchronizes the control logic of the source controller with the target controller(s). When the user has tagged certain control parameters with a master synch property, the control parameters that have been tagged will be synched during the synch operation while the control parameter that were not tagged with the master synch property will not.

Figure 6:
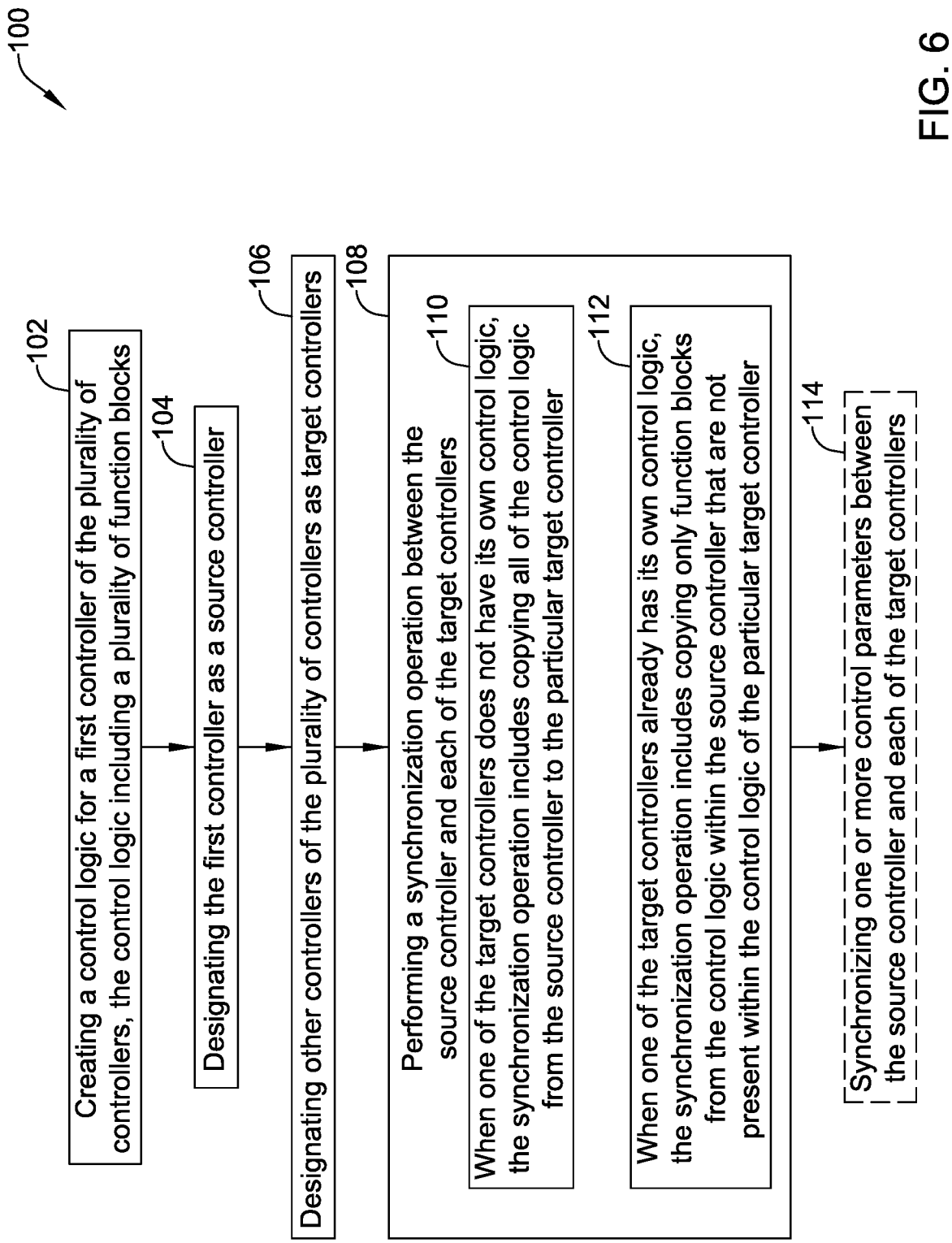
FIG. 6 is a flow diagram showing an illustrative method that may be carried out by the illustrative system of FIG. 1.

FIG. 6 is a flow diagram showing an illustrative method 100 of programming a plurality of controllers (such as the controllers 18), where each of the plurality of controllers are configured to control operation of a building component (such as the building management system components 16). A control logic is created for a first controller of the plurality of controllers, the control logic may be defined by a plurality of function blocks, as indicated at block 102. A first controller is designated as a source controller, as indicated at block 104. Other controllers of the plurality of controllers are designated as target controllers, as indicated at block 106. These designations may be made by a user via a user interface such as user interface 26 of FIG. 1. In some cases, each of the target controllers may be similar in functionality to the source controller. In some cases, the user interface will identify to the user which of the controllers are suitable to be selected as target controllers based on the selected target controller. A synchronization operation is then performed between the source controller and each of the target controllers, as indicated at block 108.

When one of the target controllers does not yet have its own control logic (e.g. original commissioning of the target controller), the synchronization operation includes copying all of the control logic from the source controller to the particular target controller, as indicated at block 110. When one of the target controllers already has its own control logic, the synchronization operation includes copying only function blocks from the control logic within the source controller that are not present within the control logic of the particular target controller, as indicated at block 112. In some instances, as optionally indicated at block 114, the synchronization operation may further include synchronizing one or more control parameters between the source controller and each of the target controllers, in the manner described above.

Figure 7:
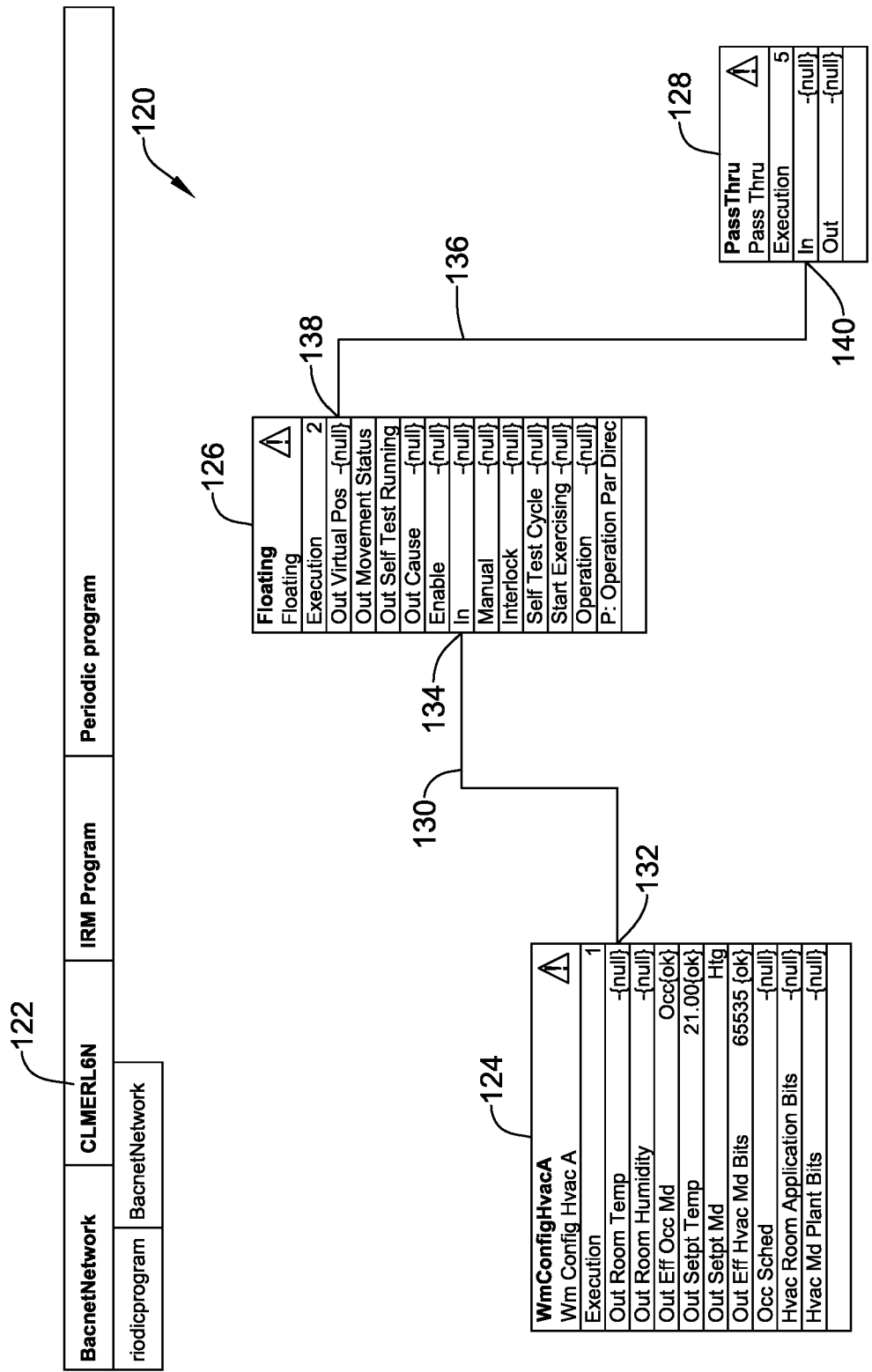
FIG. 7 is a screen shot showing an illustrative wire screen for a source controller.

FIG. 7 is a screen shot showing a wire screen 120 that includes a plurality of function blocks. This particular wire screen 120 shows the control logic, or at least a portion thereof, for a controller labeled CLMERL6N, as denoted at a tab 122. The controller labeled CLMERL6N has been designated as a source controller by the user. As illustrated, the control logic within the source controller includes a function block 124 that is labeled WmConfigHvacA, a function block 126 that is labeled Floating and a function block 128 that is labeled PassThru. The wire screen 120 includes a connector 130 that connects an Out Room Temp pin 132 with an In pin 134. The wire screen 120 includes a connector 136 that connects an Out Virtual Pos pin 138 with an In pin 140. It can be seen that the wire screen 120 shows relatively simple control logic, and it will be appreciated that a control logic is often more complex with a greater number of function blocks and a greater number of connections between function blocks.

Figure 8:
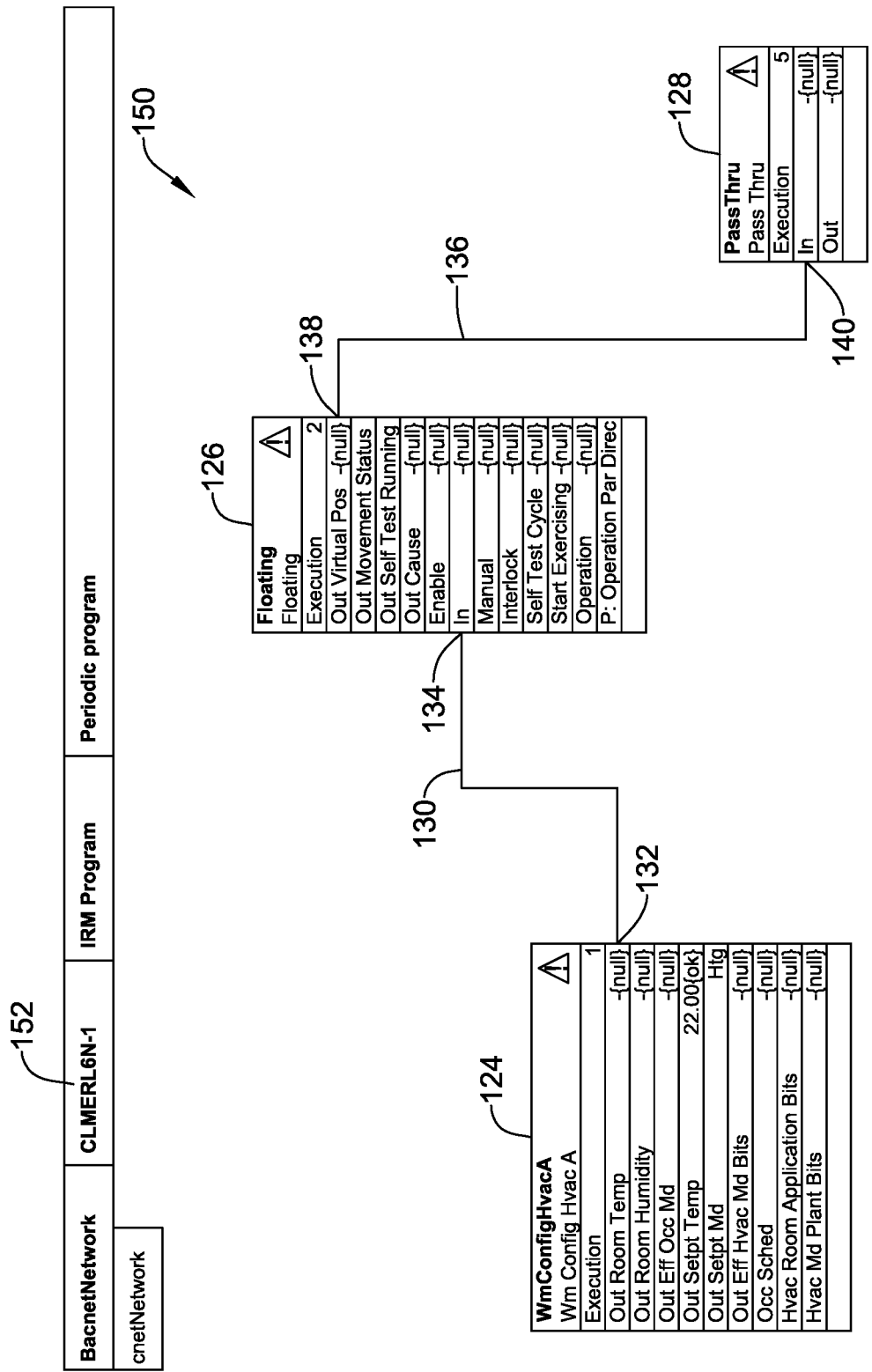
FIG. 8 is a screen shot showing an illustrative wire screen for a target controller after the target controller has been synched with the source controller.

FIG. 8 is a screen shot showing a wire screen 150 that includes a plurality of function blocks. This particular wire screen 150 shows the control logic, or at least a portion thereof, for a controller labeled CLMERL6N-1, as denoted at a tab 152. The controller labeled CLMERL6N-1 has been designated as a target controller. FIG. 8 shows the results of having synched the controller labeled CLMERL6, as a source controller, with the controller labeled CLMERL6-1, as a target controller. As will be appreciated, the wire screen 150, showing the control logic within the controller labeled as CLMERL6-1, includes the same function blocks and connections therebetween as seen in the wire screen 120, showing the control logic within the controller labeled as CLMERL6.

While not shown in FIGS. 7-8, it is contemplated that some of the control parameters of the function blocks 124, 126 and 128 may be tagged by a user with a master synch property. For example, the "interlock" control parameter of function block 126 may be tagged with a master synch property to enforce a desired interlock function for the source and target controllers. When so provided, the control parameters that are tagged with a master synch property may be synchronized as part of the synch operation, while the control parameters that are not tagged with the master synch property are not synchronized.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of commissioning a plurality of controllers, each of the plurality of controllers configured to operate one or more of a plurality of building management system components within a building management system, the method comprising:
programming a source controller of the plurality of controllers, where programming the source controller of the plurality of controllers comprises programming the source controller with a control logic that references one or more control parameter;
initiating a synch operation that synchs the control logic of the source controller with each of one or more target controllers over a network, resulting in each of the one or more target controllers having the control logic of the source controller; and
each of the source controller and the one or more target controllers subsequently controlling one or more respective building management system components using the control logic.

2. The method of claim 1, comprising:
making one or more changes to the control logic of the source controller, resulting in an updated control logic; and
initiating the synch operation to synch the updated control logic of the source controller with each of one or more target controllers over the network, resulting in each of the one or more target controllers having the updated control logic of the source controller.

3. The method of claim 2, wherein the control logic includes a number of function blocks and a number of interconnections between the number of function blocks, and wherein making one or more changes to the control logic of the source controller comprises one or more of:
adding a new function block;
removing an existing function block;
changing a control logic of an existing function block; and
changing one or more input connections and/or one or more output connections of one or more of the function blocks.

4. The method of claim 1, comprising:
assigning a master synch property to at least one of the one or more control parameters; and
the synch operation syncing those control parameters that have been assigned the master synch property with each of the one or more target controllers over the network.

5. The method of claim 4, wherein at least one of the one or more control parameters is not assigned the master synch property, and the synch operation does not synch the at least one of the plurality of control parameters that are not assigned the master synch property.

6. The method of claim 1, wherein the building management system comprises a Heating, Ventilating and Air Conditioning (HVAC) system.

7. The method of claim 1, wherein the building management system comprises a security system and/or a lighting system.

8. The method of claim 1, comprising:
discovering one or more new controllers on the network; and
initiating the synch operation to synch the control logic of the source controller with each of one or more of the new controllers.

9. The method of claim 8, comprising:
receiving a user selection of the source controller from the plurality of controllers; and
receiving a user selection of one or more target controllers from the plurality of controllers.

10. The method of claim 1, wherein each of the plurality of controllers is assigned an application type parameter, and wherein the source controller and the one or more target controllers must have compatible application type parameters.

11. The method of claim 10, wherein the source controller and the one or more target controllers must have matching application type parameters.

12. The method of claim 1, comprising discovering the plurality of controllers on the network by executing a device discovery command over the network.

13. The method of claim 1, wherein the synchronization operation includes copying only those portions of the control logic of the source controller that represent changes between the control logic of the source controller and the control logic of the particular target controller.

14. A method of sharing one or more control parameters between a plurality of controllers over a network, each of the plurality of controllers configured to control operation of a building component based at least in part on the control parameters, each of the plurality of controllers including one or more function blocks, wherein at least some of the one or more function blocks reference one or more of the control parameters, the method comprising:
receiving an assignment that assigns a master synch property to at least one of the one or more control parameters; and
for at least one function block within a source controller of the plurality of controllers, synchronizing one or more control parameters referenced by the respective function block of the source controller that has been assigned the master synch property with one or more corresponding control parameters referenced by a corresponding function block of a target controller of the plurality of controllers over the network, while not syncing the control parameters that have not been assigned the master synch property.

15. The method of claim 14, comprising:
receiving a user selection of the source controller from the plurality of controllers; and
receiving a user selection of the target controller from the plurality of controllers.

16. The method of claim 14, wherein each of the plurality of controllers is assigned an application type parameter, and wherein the source controller and the target controller must have compatible application type parameters.

17. The method of claim 16, wherein the source controller and the target controller must have matching application type parameters.

18. The method of claim 14, further comprising:
provide a listing of at least some of the plurality of controllers on a user interface;

accepting user input via the user interface to select the source controller from the plurality of controllers;

accepting user input via the user interface to select the target controller; and accepting user input to initiate synchronizing the one or more control parameters referenced by the respective function block of the source controller with corresponding control parameters referenced by the corresponding function block of the target controller.

19. A method of programming a plurality of controllers, each of the plurality of controllers configured to control operation of a building component, the method comprising:

storing a control logic for a source controller of the plurality of controllers, the control logic including a plurality of function blocks that reference one or more control parameters; and performing a synchronization operation between the source controller and each of one or more target controllers of the plurality of controllers, wherein the synchronization operation includes copying parts of the control logic of the source controller that differ from the control logic of the respective target controller and not copying parts of the control logic of the source controller that do not differ from the control logic of the respective target controller.

20. The method of claim 19, wherein the synchronization operation further comprises synchronizing one or more control parameters between the source controller and one or more of the target controllers.

\* \* \* \* \*